United States Patent [19]

Carson et al.

[11] 4,022,872

[45] May 10, 1977

[54] PROCESS FOR PREPARING FINELY-DIVIDED REFRACTORY POWDERS

[75] Inventors: Donald R. Carson, Barberton; Calvin B. Holden, Doylestown, both of Ohio

[73] Assignee: PPG Industries, Inc., Pittsburgh, Pa.

[22] Filed: Nov. 12, 1975

[21] Appl. No.: 631,241

[52] U.S. Cl. .............................. 423/297; 204/164; 250/547; 423/DIG. 10; 423/344; 423/409; 423/411; 423/561 R

[51] Int. Cl.² ........................................ C01B 35/04

[58] Field of Search .......... 423/278, 297, 344, 346, 423/409, 411, 561, 659 D; 204/164; 250/542–547

[56] References Cited

UNITED STATES PATENTS

| | | | |
|---|---|---|---|
| 3,253,886 | 5/1966 | Lamprey et al. | 423/344 |
| 3,340,020 | 9/1967 | Neuenschwander et al. | 423/291 |
| 3,658,673 | 4/1972 | Kugler et al. | 204/164 |
| 3,723,601 | 3/1973 | Svanstrom | 423/440 |
| 3,891,562 | 6/1975 | Mogensen et al. | 250/547 |

*Primary Examiner*—G. O. Peters
*Attorney, Agent, or Firm*—Irwin M. Stein

[57] ABSTRACT

Helical flow of hot plasma gas, e.g., hydrogen gas, produced by a gas vortex stabilized plasma arc is cancelled by introducing attenuating gas, e.g., hydrogen gas, into the hot plasma gas in a manner such that the attenuating gas assumes a vortical direction opposite to the helical flow of the hot plasma gas. The resulting gas stream is well-collimated. The well-collimated plasma gas stream is used in the preparation of finely-divided refractory metal and metalloid carbides, borides, nitrides, silicides and sulfides. Reactants for the preparation of the aforementioned refractory powders are introduced into the collimated plasma gas stream. The reaction is conducted in the gas phase within a reactor and solid, finely-divided refractory powder removed from the reactor.

15 Claims, 1 Drawing Figure

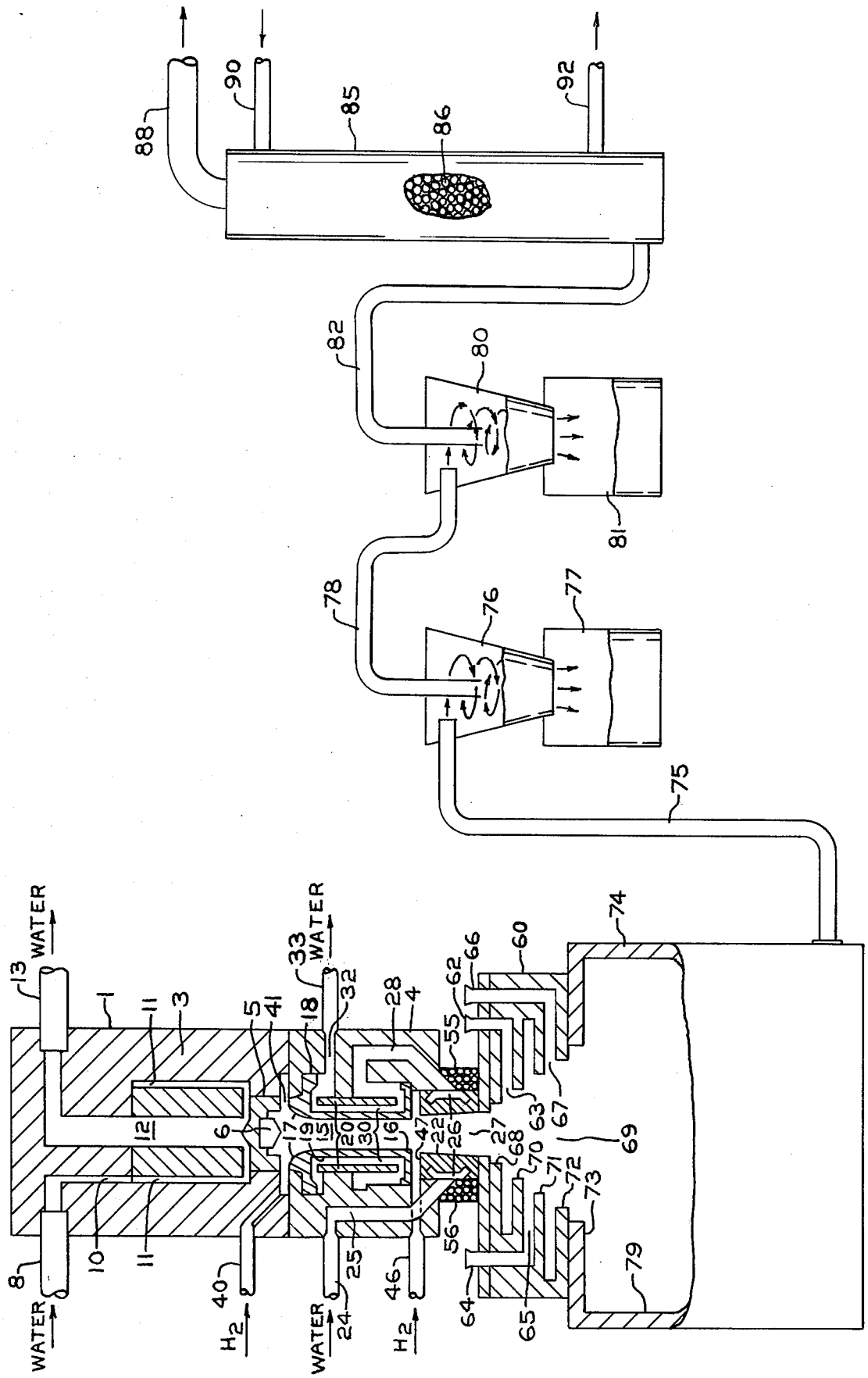

PROCESS FOR PREPARING FINELY-DIVIDED REFRACTORY POWDERS

DESCRIPTION OF THE INVENTION

The preparation of finely-divided refractory powders, e.g., borides, carbides, silicides, nitrides and sulfides of the metals and metalloids of Groups III–VI of the periodic table, by reaction in the gas phase of a vaporous halide of the metal or metalloid and a reactant gas containing a source of the non-metallic element with which the selected metal or metalloid is to be combined has been described. See, for example, U.S. Pat. Nos. 3,253,886, 3,340,020, 3,485,586, and West German Offenlegungsschrift (DT-OS) No. 2,420,621. See also the reference text, *Refractory Hard Metals*, by Schwarzkopf and Kieffer, The MacMillan Company, New York, N. Y. (1953). In the production of the aforementioned finely-divided refractory powders, the metal halide reactant and reactant gas containing the source of boron, carbon, silicon, nitrogen or sulfur are brought together within a reactor at the desired reaction temperatures. The refractory powder products formed are removed from the reaction zone within the reactor, cooled or quenched as the case may be, and recovered by conventional fine particle collection techniques, e.g., cyclones, electrostatic precipitators, dust collectors, filters, etc. In the aforementioned DT-OS No. 2,420,621, the heat necessary to carry out the reaction is furnished by a plasma gas, e.g., a hot hydrogen stream prepared by heating hydrogen in plasma arc heating means.

In the production of finely-divided powders of the aforesaid refractory compounds, it is common to bring the reactants together quickly within the reactor at the reaction temperature most conductive for the formation of the desired compound. This procedure permits a substantial portion of the reaction to occur at substantially uniform conditions and enhances the opportunity for product uniformity. In the aforementioned DT-OS No. 2,420,621, this is accomplished by introducing the reactants into a hot plasma gas stream as the gas discharges from the arc heater. This procedure dictates that the reactants be introduced from a reactant inlet assembly, which is typically adjacent or close to the gas discharge end of the arc heater. Because the reaction which forms the aforesaid refractory powders is substantially instantaneous at the temperatures produced by the hot plasma gas, the reactant inlet assembly is also nearly adjacent to the reaction zone.

Plasma arc heating means used typically for chemical synthesis work is the non-transferred direct current arc heater. In such an arc heater, the plasma gas is passed through the arc struck between an anode and cathode and emerges through a nozzle in the anode as the hot-plasma gas stream or "flame". In order to provide continuity of arc heater operation, it is necessary that the arc struck between the anode and cathode be stabilized, i.e., that the arc is maintained without self-extinguishing. This provides the continuous flame necessary for the continuity required in chemical synthesis applications. Stabilization of the arc is accomplished by two general techniques, i.e., gas stabilization and liquid stabilization. These categories have been further classified as vortex-stabilized, gas sheath-stabilized, wall-stabilized, magnetically-stabilized, and water-stabilized.

A common technique for stabilizing a non-transferred arc is gas-vortex stabilization. This is accomplished typically by introducing the plasma gas tangentially into the arc chamber located between the cathode and anode so as to impart a helical flow pattern to the plasma gas through the space occupied by the arc, which is normally within the hollow cylindrical anode. The helical or swirl motion of the plasma gas constricts and compresses the arc column toward the center of the space through which the arc passes, which confinement increases the current density, the voltage gradient and the arc column temperature.

As the swirling hot plasma gas stream discharges from the anode of the arc heater, centrifugal forces acting on the gas stream tend to make it flare out and produce a diverging cone of gas, thereby contacting exposed surfaces of the reactant inlet assembly and reactor surfaces. Consequently, portions of the exposed surfaces of the reactant inlet assembly are heated to high temperatures and such hot surfaces become points on which the gas phase reaction can occur. Thus, there is a strong tendency for the reactants to react on such hot, radiant surfaces, form solid refractory powdery product and collect on such radiant surfaces. Further, the swirling gas can carry powdery product to these surfaces where it will deposit and accumulate. The temperature of these surfaces are high enough to melt and sinter the powdery product to a useless waste material for the purpose intended. These deposits can grow to a point that they eventually partially or even completely block the inlet ports in the reactant inlet assembly through which the reactants flow into the reactor. Partial blockage of such inlet ports can cause a deviation from the desired reactant flow pattern with a consequent upset in the mixing dynamics and an upset in the ensuing reaction conditions. Partial blockage of the aforementioned inlet ports often results in additional product growth on the reactant inlet assembly.

Similarly, the diverging cone of hot plasma gas produces radiant surfaces on a portion of the reactor. The low pressure center of the swirling hot gas also provides a medium for transporting solid product from elsewhere in the reactor into the swirling gas and against the radiant surfaces in the reactor. Deposits of product on these surfaces also can become sintered and lost as useful powdery product. When scraping means are used to remove powdery product from the walls of the reactor, sintered deposits interfere with the movement of the scraper. Such deposits also can interfere with the operation of reactor accessories with the reactor, e.g., thermocouples.

Introducing plasma gas radially into the arc chamber (as opposed to tangential injection) produces a collimated column of hot plasma gas discharging from the arc heater; however, it has been found that this method of operation is useful only for low rates of production. Attempts to operate a direct current non-transferred arc heater with radial injection of plasma gas and at relatively high power levels (in order to provide the required amount of heat for higher rates of production) resulted in very short electrode life, particularly the cathode, and arc instability.

Even with a collimated column of hot plasma gas, there is a tendency for deposits of product to occur near the top of the reactor where heat removal from the reactor wall is not as efficient, e.g., at the underside of the top of the reactor below and adjacent to the reactant inlet assembly. Such deposits grow and eventually fall to the bottom of the reactor. However, during growth, the deposits can interfere with the mixing pattern of the reactants. These deposits also represent a loss of useful product. This type of deposits or product growth, as it is often called, can be controlled and often completely eliminated by introducing anhydrous hydrogen halide into the reactant mixing zone. Use of hydrogen halide, however, does not eliminate the product growth or reactor walls caused by the diverging cone of swirling hot plasma gas, which produces radiant surfaces on the exposed portions of the reactor. The aforementioned DT-OS No. 2,420,621 describes use of anhydrous hydrogen halide in the reactant mixing zone to reduce deposits of solid refractory powdery product. Since hydrogen halide, e.g., hydrogen chloride, is produced as a product of the gas phase reaction, the addition of added amounts of hydrogen halide, e.g., hydrogen chloride, to the reactor reduces the potential conversion of metal halide reactant at the reaction conditions chosen in accordance with well known chemical reaction kinetic principles.

It has now been discovered that finely-divided refractory powders, e.g., titanium diboride, silicon carbide, etc., can be prepared with gas vortex stabilized arc heating means without the difficulties associated with helical gas flow. In particular, a vortex cancellation section, i.e., collimating means, is integrated into the arc heater. In this section, attenuating gas, e.g., hydrogen gas, is introduced into the arc heater in a manner such that it flows in a vortical path opposite to the hot plasma gas and mixes with the hot plasma gas. This procedure effects cancellation of the rotational moments of both the hot plasma gas and the attenuating gas and results in a well-collimated gas stream discharging from the vortex cancellation section and the arc heater. The well-collimated gas stream is discharged from the arc heater into the reactant mixing zone, e.g., through the reactant inlet assembly, and the reactants projected into the collimated gas stream. By this technique, improved rates of production and yields of usable product can be achieved without the serious disadvantages associated with helical flow within the mixing zone and the reactor. Further, more continuous operation results.

BRIEF DESCRIPTION OF THE DRAWING

The process described herein can be better understood by reference to the accompanying drawing which is a diagrammatic illustration of arc plasma gas heating means, reactor means and auxiliary product recovery equipment means (cyclone and scrubbing means) for recovering refractory powder product and treating reactor effluent gas.

DETAILED DESCRIPTION

Referring now to the accompanying drawing there is shown arc plasma heating means 1 mounted atop reactant inlet assembly 60 which, in turn, is mounted atop reactor 74. Although the aforesaid apparatus is shown in vertical alignment, other alignments away from the vertical including a horizonal alignment are contemplated. Cathode 6 is shown mounted in cup 5 within cathode housing assembly 3. Cylindrical hollow anode 18 is shown mounted in anode housing assembly 4, which is electrically insulated from cathode housing assembly 3. The cathode and anode can be prepared from materials commonly employed as electrodes in arc plasma heaters. These include tungsten and copper. Typically, the cathode is tungsten having a tip which is commonly modified with thoria or zirconia additives or inserts of such materials to improve the emission of electrons, which assists in cooling of the cathode. The cathode is commonly solid, e.g., a rod, and, as shown, has a head in the shape of a flush point. Other shapes, e.g., a flat head, can also be used. The anode is generally made of copper, e.g., OFHC copper or tungsten lined copper. Cathode cup holder 5 is also usually fabricated from copper. As shown, the cathode and anode are axially aligned. Anode 18 is conically shaped at its upper end to provide a throat 17 which tapers down to a normal cylindrical shape. The cylindrical hollow anode provides a passageway 15 which terminates in an orifice 16.

Adjacent to but spaced from the orifice 16 of anode 18 is collimating means 22, which is a hollow cylinder that can be fabricated from copper. The internal top diameter of collimator 22 is slightly larger than the internal diameter of the orifice 16 of anode 18 so that the hot plasma gas can be mixed efficiently with attenuating, anti-swirl gas in mixing zone 27. As shown, the bottom diameter of collimator 22 is slightly larger than the top diameter to provide a conically shaped mixing zone 27 and is equal to the minimum diameter of reactant inlet assembly 60, which is adjacent to and axially aligned with collimator 22, anode 18 and cathode 6. Case should be exercised to avoid eddy currents along the wall of the conically shaped collimator 22.

As is conventional with arc plasma heaters, the electrodes and appurtenances are cooled with a suitable coolant to prevent melting thereof. As shown, the cathode is cooled by water, which is shown being introduced into the cathode housing assembly 3 through conduit 8. Such water passes through passage 10, which leads into annular passage 11. Annular passage 11 leads to the rear of cathode holder 5, which is fin shaped to promote the removal of heat. Water from the annular passage 11 contacts the back of cathode holder 5 and is removed through passage 12 and conduit 13.

Anode 18 and collimating means 22 are cooled by introducing water into conduit 24 within anode housing assembly 3. Conduit 24 communicates with passage 25 which in turn leads to annular opening 26 within collimating means 22. From annular space 26, coolant water proceeds through passage 28 until cylindrical baffle 20 is reached. Baffle 20 is spaced from the outside wall of anode 18 to provide a narrow annular passage 30 for the flow of water at high velocities around the outside of anode 18. As shown, water flows downwardly on the outside of baffle 20 and up through narrow passage 30 formed by the inside wall of baffle 20 and the outside wall 19 of anode 18. Water is removed from the arc heater through passage 32 and conduit 33. While water has been described as the coolant, any suitable coolant can be used.

Positioned around collimating means 22 is field coil 55 which is composed of many turns of internally cooled copper coil 56. Cathode 6, anode 18 and field coil 55 are connected to direct current power sources not shown. Typically, the power source for the electrodes is separate from that of the field coil. Between the cathode and anode are gas ports 41 for introducing plasma gas into the chamber formed by the anode throat 17 and cathode 6. Gas ports 41 are in gas communication with conduit 40. As shown, hydrogen is used as the plasma gas. There are typically four gas bores 41, i.e., one at each quadrant, which are bored in a manner to provide tangential introduction of the plasma gas, e.g., hydrogen, into the chamber between the cathode and anode throat. The tangential introduction of plasma gas in the manner described produces helical or swirl flow of the plasma gas as it transcends the passageway 15 provided by anode 18. The resulting vortex helps to stabilize the arc — hence the name, gas vortex stabilization.

Similarly, between the orifice 16 of anode 18 and the head of collimating means 22 are gas bores 47 for introducing attenuating gas. Such bores are in gas communication with conduit 46. Typically, gas bores 47 are similar to that of gas bores 41 except that they are bored to provide helical gas flow in a direction opposite to that produced by bores 41. The particular apparatus and means for cancelling the plasma gas helical flow described herein and the accompanying drawing are not critical. Other techniques for introducing attenuating gas with a counteracting vortical flow can be used. See, for example, U.S. Pat. No. 3,171,010 to Potter who describes other means for producing a plasma flame useful for cutting torches and spraying of solid materials.

Adjacent to collimating means 22 is reactant inlet assembly 60 which, as shown, comprises three coaxial, longitudinally spaced annular conduits 63, 65 and 67 that are provided with inlet nozzles 62, 64 and 66 respectively. The exit port of annular conduit 63 is retracted from the exit port of annular conduit 65; and the exit port of annular conduit 67 is retracted from the exit port of annular conduit 65 to provide a conical reactant introduction zone 69 wherein the reactants merge and begin mixing with the collimated plasma gas stream projected from the outlet of collimating means 22. The flow path of the reactant discharge through the exit ports of annular conduits 63, 65 and 67 can be perpendicular to the collimated hot plasma gas stream, as shown. If desired, the exit ports also can be positioned away from the perpendicular, i.e., downwardly or upwardly at an angle of from 1° to 45° from the horizontal position shown so that the reactant gas flow is directed at such angle into or in contact with the hot collimated plasma gas stream. The reactant gas can be projected radially, tangentially or at any suitable angle therebetween into the collimated stream of hot plasma gas.

Hydrogen is used preferably as the plasma gas which is heated by arc heater 1; however, other gases, e.g., the noble gases, can be used. Argon, neon and helium are also suitable plasma gases. The use of hydrogen as the plasma gas is advantageous since it ensures the establishment of a reducing atmosphere and serves as a halogen, e.g., chlorine, acceptor, thereby removing halogen released from the halogen containing reactants as hydrogen halide. Mixtures of hydrogen with other gases, such as the noble gases, e.g., argon, neon or helium, can also be employed as the plasma gas. When a noble or other gas is used solely as the plasma gas, the hydrogen required for the gas phase reaction is introduced into the reactor by mixing it with the reactants or as a separately introduced stream, e.g., as the attenuating gas or a separate gas stream introduced through the reactant inlet assembly. Nitrogen can also be used as the plasma gas, especially in the production of refractory metal nitrides.

In the typical operation of arc heater 1, anode 18, cathode 6, and field coil 55 are connected to suitable sources of direct current, not shown. The power source for the field coil is usually separate from the power source for the electrodes. The magnetic field produced by field coil 55 assists in stabilizing the arc. Coolant water is introduced into the arc heater through conduits 8 and 24 and hydrogen plasma gas is introduced into nozzles 40 and 46. An arc is struck between the cathode 6 and anode 18. Plasma gas introduced tangentially through bores 41 and into the chamber between the cathode and anode flows in a helical path across throat 17 of anode 18 and thence through the passageway 15 of anode 18 while retaining a helical flow path. As the plasma gas passes through the anode, it is heated to high temperatures by the arc. The hot plasma gas exiting from orifice 16 of anode 18 is mixed with attenuating hydrogen (anti-swirl) gas flowing from bores 47. The attenuating gas is introduced tangentially into the head of mixing zone 27 by means of bores 47; however the direction of introduction is opposite to that which the plasma gas is introduced. For example, if the plasma gas is introduced in a clockwise direction, the attenuating gas is introduced in a counter-clockwise direction and vice-versa. Attenuating gas is introduced through bores 47 in amounts to substantially cancel the helical flow pattern of the hot plasma gas. The net effect is the cancellation of the rotational moments of both the hot plasma gas and attenuating gas and the production of a well-collimated hot plasma gas stream which is projected into introduction zone 69 of the reactant inlet assembly 60.

Attenuating gas introduced into conduit 46 for use in cancelling the helical flow pattern of the hot plasma gas is usually the same gas as the plasma gas. Thus, if the plasma gas is hydrogen, the gas used for cancellation of the swirling motion of the plasma gas is also hydrogen. However, any inert gas can be used as the attenuating gas. For example, noble gases such as argon, neon or helium can be used. By "inert", is meant that the gas is chemically innocuous to the chemical gas phase synthesis reaction which occurs in reactor 74 and to the refractory powder product produced therein.

The attenuating gas can be at any suitable temperature, i.e., from ambient temperature to temperatures approaching that of the hot plasma gas. Economically, it is preferred that the cancelling gas be at about ambient temperature for the reasons that such arrangement does not require the economic drawback of heating the attenuating gas. Further the addition of a relatively cool gas to the region of the orifice of the anode tends to prevent the formation of an ionized gas path outside the anode so that the arc terminates within the anode. Moreover, the amount of heat required to be removed downstream is reduced thereby. Generally, the temperature of the heated plasma gas is sufficiently high so that when it is diluted with cooler attenuating gas, the temperature of the plasma gas is not lowered to a level insufficient to provide the heat necessary for conducting the chemical gas phase synthesis reaction described hereinafter. However, care should be observed in seeing that the attenuating gas is not of a temperature that the plasma gas temperature is reduced to a temperature at which the gas phase reaction cannot be initiated or sustained. In such an unlikely event, the attenuating gas will be required to be heated by auxiliary means. The amount of anti-swirl gas utilized should be that amount which is just sufficient to cancel substantially the helical flow pattern of the hot plasma gas, i.e., an amount just sufficient to cancel the rotational moment of the hot plasma gas. Caution should be observed in selecting the amount of attenuating gas for the reason that if not enough is used, the hot plasma gas will retain some of its rotational or helical flow pattern. Conversely, if too much is used, the hot plasma gas will take on the helical flow pattern of the attenuating gas. The amount of attenuating gas may vary also with the design of the equipment, e.g., collimator 22 and bore 47. The ratio of plasma gas to attenuating gas can vary and will vary with the volume of plasma gas used, which itself can vary with the rate of production. Generally, the aforesaid ratio increases with increasing volumes of plasma gas, i.e., the required amount of attenuating gas increases at a rate slower than does the amount of plasma gas. Typically, the volumetric ratio of plasma gas to attenuating gas will vary between about 3:1 and 1:1 e.g., 1.5:1 to 2:1. The amount of attenuating gas required to substantially cancel the helical flow of the plasma gas is referred to herein as a "cancelling amount". One skilled in the art can observe readily when a "cancelling amount" of attenuating gas is being used by observing the operation of the arc heater by itself, and by operating the heater and inspecting for product deposits from time to time.

The collimated plasma gas from collimating means 22 is projected into conical reactant introduction zone 69. The reactants are introduced into that zone through at least one of the nozzles 62, 64 or 66 and conduits 63, 65 or 67. The reactants mix with the hot plasma gas and are projected into reactor 74.

As shown in the accompanying drawing, finely-divided refractory metal powder product produced in reactor 74 is removed therefrom through conduit 75, suspended in the effluent product gases and introduced into cyclones 76 and 80 in order to separate the refractory powder product from the product gases. The cyclones are normally cooled, e.g., externally cooled, to cool the product. For example, the cyclones can be traced with tubing through which coolant, e.g., water, is passed. As shown, the discharge from conduit 75 is introduced tangentially into cyclone 76 and the discharge from conduit 78 of cyclone 76 is forwarded to cyclone 80. Refractory powder product drops out into receivers 77 and 81 respectively while gaseous effluent leaves cyclone 80 through conduit 82 and into scrubber 85 which is packed with suitable packing 86, e.g., balls, berl saddles, raschig rings, etc., to provide intimate contact between the effluent gas from cyclone 80. Scrubbing solution is introduced into scrubber 85 through conduit 90 and is withdrawn through conduit 92. Scrubbed product gas is withdrawn from scrubber 85 through conduit 88. The scrubbing solution is typically water or an aqueous caustic solution which is capable of neutralizing the hydrogen halide and hydrolyzing halogen containing components, e.g., unreacted reactants, present in the effluent product gas stream. The thus scrubbed product gas can then be forwarded to a flue for disposal. While only two cyclones and receivers are shown, more than two can be used. Alternatively, a single cyclone and receiver can be used.

The present invention is applicable to the vapor phase production of boride, carbide, silicide, nitride and sulfide powders of the metals and metalloids of Groups III, IV, V, and VI and the ferro metals of Group VIII of the Periodic Chart of the Elements, such as that found on the back cover of the aforementioned text, *Refractory Hard Metals*. Included in Group III of the Periodic Chart of the Elements are the metals of the actinide series, e.g., thorium, uranium, neptunium, and plutonium. The present invention is particularly applicable to the preparation of the borides, carbides and nitrides of the metals and metalloids, especially the transition metals, of groups III–VI of the aforementioned Periodic Chart of the Elements. Of special commercial significance are the borides and carbides of the metals and metalloids of groups IV–VI, e.g., groups IV and V, and the nitrides of the metals and metalloids of groups III–V, e.g., III–IV.

More specifically, metals and metalloids within the aforementioned groups that are contemplated include: boron, aluminum, silicon, titanium, zirconium, hafnium, tantalum, vanadium, niobium, chromium, molybdenum, tungsten, iron, cobalt, and nickel. As used hereinafter in the specification and claims, the term "metal(s)" is intended to mean and include both the metals and metalloids referred to above. Of particular interest are the metals aluminum, boron, silicon, titanium, zirconium, hafnium, tantalum, vanadium, niobium and tungsten.

In accordance with the present invention, halides of the aforementioned metals that are volatile at the temperatures of the particular gas phase reaction conducted and which, in combination with the non-metal-containing reactant, provides a thermodynamically favorable reaction at such reaction temperature, are used in the present process. While the chlorides of the metals are preferred, the fluorides, bromides or iodides are also contemplated. In addition to the normal halides of the principal valence of the aforementioned metals, subhalides, e.g., subchlorides, are also contemplated. Further, mixtures of halides, such as chlorides and bromides, or of halides and subhalides are contemplated as being useful.

Examples of such halides (as exemplified by the chlorides) include: aluminum chloride, boron trichloride, silicon tetrachloride, titanium tetrachloride, zirconium tetrachloride, hafnium tetrachloride, tantalum pentachloride, vanadium pentachloride, niobium pentachloride, chromium chloride, molybdenum chloride, tungsten hexachloride, ferric chloride, cobaltic chloride, nickel chloride, uranium hexachloride and thorium tetrachloride.

For the non-metallic portion of the compositions contemplated herein, a source of boron, carbon, silicon, nitrogen or sulfur is introduced into the reaction zone. As a source of carbon, there can be mentioned hydrocarbons and halogenated hydrocarbons or mixtures of such compounds. As used herein, the term "halogenated hydrocarbon" or "halocarbon", e.g., "chlorinated hydrocarbon", is intended to mean and include both compounds of carbon, halogen and hydrogen, and compounds of carbon and halogen, e.g., carbon tetrachloride.

Typical of the hydrocarbons that can be used as the carbon source include the normally gaseous or liquid but relatively volatile hydrocarbons including saturated and unsaturated $C_1$–$C_{12}$ hydrocarbons, such as methane, ethane, propane, the butanes, the pentanes, decanes, dodecanes, ethylene, propylene, the butylenes and amylenes, symmetrical dimethylethylene and like alkenes; cycloaliphatic and aromatic hydrocarbons, such as cyclopentane, cyclohexene, cyclohexane, toluene, benzene, etc.; and acetylenic compounds, of which may be noted acetylene, ethyl acetylene and dimethyl acetylene. Methane or propane are economically preferred. Rarely are hydrocarbons of more than twelve carbons used.

Examples of halohydrocarbon and halocarbon compounds that can be used as the source of carbon in the process described herein include saturated and unsaturated compounds containing halogen(s) and from one to twelve, more usually one to eight, carbon atoms, such as methyl chloride, chloroform, ethyl chloride, carbon tetrachloride, dichloro-difluoromethane, n-propyl chloride, amyl chloride, vinyl chloride, 1,1-dichloroethylene, cis and trans 1,2-dichloroethylene, 1,1-dichloroethane, 1,2-dichloroethane, ethylene dibromide, trichloroethylene, perchloroethylene, propylene dichloride, 1,1,2-trichloroethane, 1,1,1-trichloroethane, 1,1,1,2,- and 1,1,2,2-tetrachloroethane, hexachloroethane and like aliphatic chlorides, fluorides, bromides or iodides containing up to about twelve carbon atoms, most preferably up to about six carbon atoms. Aromatic halocarbon compounds, e.g., chlorocarbon compounds, also can be used. Such compounds include $C_6$–$C_9$ halogenated aromatic compounds, such as monochlorobenzene, orthodichlorobenzene, paradichlorobenzene and the like. Cycloaliphatic halides, such as the $C_5$–$C_6$ aliphatic halides, e.g., chlorinated cyclopentadiene, cyclohexylchloride, etc. can also be used. Preferably, the halogen of the halogenated hydrocarbon is the same as the halide of the metal halide reactant and hydrogen halide introduced into the mixing zone.

Typically, the above-described hydrocarbons and halogenated hydrocarbons should be readily vaporizable (volatile) without tar formation since otherwise unnecessary difficulties which are unrelated to the process itself can arise, such as plugging of lines by decomposition and/or polymerization products produced in the course of vaporizing these reactant materials.

As a source of nitrogen, there can be used nitrogen, ammonia, and hydronitrides, e.g., $N_2H_4$ and $N_2H_4 \cdot NH_3$. Nitrogen and ammonia or mixtures thereof are preferred.

As a source of boron, there can be mentioned boron tribromide, boron triiodide, boron trichloride, boron trifluoride, and hydroborides (boranes), e.g., $B_2H_6$, $B_5H_9$, $B_{10}H_{14}$, $B_6H_2$. Boron trichloride is preferred.

As a source of sulfur, there can be mentioned vaporous sulfur, hydrogen sulfide, sulfur halides, such as $S_2Cl_2$, $SCl_2$ and $S_2Br_2$. Hydrogen sulfide is preferred.

As a source of silicon, there can be mentioned silicon tetrachloride, tetrabromide and tetraiodide, hydrosilicides (silanes), e.g., $SiH_4$, $Si_2H_6$, $Si_3H_8$ etc., halogenated hydrosilicides, e.g., $SiH_3Cl$, $SiH_2Cl_2$, and $SiHCl_3$. Silicon tetrachloride is preferred.

The amount of the reactant source of silicon, carbon, nitrogen, boron or sulfur with which the metal halide reactant is reacted should be at least in stoichiometric quantities with the metal halide reactant to satisfy the theoretical demand of the particular reaction desired. However, less than a stoichiometric amount of the source of silicon, boron, nitrogen, carbon or sulfur can be used. Normally, an excess amount of the more volatile reactant is employed in order to react substantially completely the less volatile reactant. The relative amounts of the reactants used is not critical. The stoichiometric amount of reactants required can be readily calculated by one skilled in the art.

In addition to the metal halide and source of silicon, carbon, nitrogen, boron or sulfur, it is customary to use hydrogen to assist in the formation of the hydrogen halide by product. The amount of hydrogen utilized in the above-described process should be at least that amount which is required stoichiometrically to satisfy the theoretical demand of the particular reaction desired. The theoretical amount of hydrogen is the amount necessary to combine with all of the halogen introduced into the reactor by the reactants and additives to produce hydrogen halide, taking into account the hydrogen available from other sources present in the reactor. Typically, the amount of hydrogen used is in excess of the theoretical amount. Often, the amount of hydrogen utilized will be from two to 10 times, or more, the amount of theoretical hydrogen required by the reaction being conducted. Typically, the mole ratio of hydrogen to metal halide reactant will range between about 20 and 40, e.g., 25, moles of hydrogen per mole of metal halide reactant. The hydrogen can be supplied by means of the plasma gas, attenuating gas, reactant carrier gas, etc.

Any convenient method for bringing the reactants together at reaction temperatures can be used. As shown in the accompanying figure, the reactants are introduced individually into reactor 74 through reactant inlet assembly 60. For example, in the production of titanium diboride, titanium tetrachloride is introduced into nozzle 64 and annular conduit 65, and boron trichloride is introduced into nozzle 66 and annular conduit 67. The reactants merge with the collimated hot plasma gas in zone 69 and all are projected into reactor 74. As further exemplification, other of the metal halides previously mentioned can be substituted for titanium tetrachloride and expect to obtain the corresponding metal boride. Similarly, by substituting a hydrocarbon or halogenated hydrocarbon compound for boron trichloride one can expect to obtain titanium carbide; and by substituting other previously described metal halides for titanium tetrachloride, other metal carbides can be produced. Further, by using a nitrogen plasma or other source of nitrogen, the metal nitrides described hereinabove can be expected to be produced. Analogously, the sulfides and silicides can be expected to be obtained.

Reaction temperatures for the processes described herein will, of course, vary with the reactants and the products being produced. Gas phase reaction temperatures for such products are reported to range from about 300° C. to about 4,000° C. Deposition temperatures from the gas phase for the production of various carbides, nitrides, borides and silicides from various reactants are well known and can be found on pages 61, 226, 275 and 322, respectively, of the reference text, *Refractory Hard Metals*, supra. That disclosure is incorporated herein by reference. For examples, deposition temperatures for the preparation of metal carbides of groups IV and V of the aforementioned periodic chart range between 1300° C. and 2400° C., e.g., silicon carbide forming temperatures are described as between 1300° C. and 2000° C. Deposition temperatures for the aforementioned metal borides range between 900° C. and 2700° C., e.g., titanium diboride forming temperatures are described as ranging from 1000° C. to 1300° C. Deposition temperatures for the preparation of metal sulfides are also known. For example, titanium sulfide can be prepared in a hot tube by the reaction of titanium tetrachloride and hydrogen sulfide at about 600° C. Tungsten disulfide can be prepared by the reaction of tungsten hexachloride and hydrogen sulfide at about 375°–550° C. Calculated reaction temperatures for the preparation of the aforementioned products with a hydrogen plasma are in the range 2500° C.–3500° C.

The refractory metal powders produced by the present gas phase process are typically submicron in size. Typically, at least 90 percent of the particles that make up the powder range in size between 0.05 and 1.0 microns, i.e., the nominal sectional diameter of the particles is within that range. The nominal sectional diameter is the nominal diameter of a particle viewed under high magnification, e.g., 25,000 magnification.

Among the carbides that can be expected to be produced in accordance with the present process, there can be mentioned titanium carbide, zirconium carbide, hafnium carbide, vanadium carbide, niobium carbide, the tantalum carbides ($Ta_2C$, $TaC$), silicon carbide (alpha and beta), boron carbide ($B_4C$), chromium carbide, molybdenum carbide, the tungsten carbides ($W_2C$, $WC$), the thorium carbides ($ThC$, $ThC_2$), and the uranium carbides ($UC$, $U_2C_3$ and $UC_2$).

Among the nitrides that can be expected to be produced in accordance with the present process, there can be mentioned titanium nitride, silicon nitride, zirconium nitride, hafnium nitride, vanadium nitrides ($VN$, $V_3N$), niobium nitride, tantalum nitride, boron nitride, the chromium nitrides ($Cr_2N$, $CrN$), molybdenum nitride, tungsten nitride (beta, gamma and alpha), the molybdenum nitrides ($Mo_2N$, $MoN$), thorium nitride, the uranium nitrides ($U_2N_3$, $UN_2$), neptunium nitride and plutonium nitride.

Among the borides that can be expected to be produced in accordance with the present process, there can be mentioned the titanium borides ($TiB$, $TiB_2$), the silicon borides ($SiB_3$, $SiB_6$), the zirconium borides ($ZrB_2$, $ZrB_{12}$), hafnium boride, the vanadium borides ($VB$, $VB_2$), the niobium borides ($NbB$, $NbB_2$), the tantalum borides ($TaB$, $TaB_2$), the chromium borides ($CrB$, $CrB_2$), the molybdenum borides ($Mo_2B$, $MoB$) (alpha and beta) ($MoB_2$ and $Mo_2B_5$), tungsten boride, thorium boride and uranium boride.

Among the silicides that can be expected to be produced in accordance with the present invention, there can be mentioned titanium silicides, zirconium silicide, the vanadium silicides ($V_3Si$, $VSi_2$), niobium silicide, tantalum silicide, the chromium silicides ($Cr_3Si$, $CrSi$, $CrSi_2$), the molybdenum silicides ($Mo_3Si$, $MoSi_2$), tungsten silicide, thorium silicide, the uranium silicides ($USi$, alpha $USi_2$, beta $USi_2$), neptunium silicide and plutonium silicide.

Among the sulfides contemplated herein, there can be mentioned titanium disulfide, zirconium sulfide, tungsten disulfide, molybdenum sulfides, vanadium sulfides, thorium sulfide, tantalum sulfide, silicon sulfides, cobalt sulfides, etc.

The practice of the present process provides for the passage of a well-collimated hot plasma gas stream through conical reactant introduction zone 69. As described earlier, when the hot plasma gas has vortical flow, it tends to flare out and produce radiant surfaces on the reactant inlet assembly 60, e.g., the lips 68, 70, 71 and 72 of the inlet assembly exposed to the hot plasma gas. Such radiant surfaces can also be produced on the underside surface 73 of the top of the reactor wall where cooling of the reactor surface is not efficient and on the side wall 79 of the reactor.

Even with a collimated hot plasma gas stream, there is a tendency for radiant surfaces to be produced on the underside 73 of the top of the reactor wall and on exposed surfaces of the reactant inlet assembly due to inherent variations in the flow rates of the various reactant and inert gas streams used, thereby causing deviation of the gas streams from their designed flow paths. Deposits of refractory powder product on such surfaces, especially the underside 73 of the reactor, can be substantially eliminated in such circumstances by introducing anhydrous hydrogen halide in small amounts to zone 69.

As described in DT-OS No. 2,420,621, the substantially anhydrous hydrogen halide used can be selected from the group consisting of hydrogen chloride, hydrogen bromide, hydrogen fluoride and hydrogen iodide. Hydrogen chloride is economically preferred. The halide portion of the hydrogen halide is generally the same as the halide portion of the metal halide reactant. The amount of anhydrous hydrogen halide used can vary between about 10 and 100 mole percent, usually from 20 to 60 mole percent, based on the metal halide reactant. The anhydrous hydrogen halide can be added to zone 69 in any suitable manner, e.g., with the reactants, as a separate stream, etc.

The present process if more particularly described in the following examples which are intended as illustrative only since numerous modifications and variations therein will be apparent to those skilled in the art.

In the following examples, volumes of gas are expressed in cubic feet per hour at standard conditions (14.7 pound pressure and 70° F.), or SCFH. The apparatus used is similar to that described in the accompanying drawing. The arc heater is a direct current plasma arc heater. The arc heater operates with an efficiency of from about 50 to 75 percent. The field coil was composed of 23 turns of internally cooled copper tubing. The inside diameter of the coil was 2 inches and the coil is supplied with from 50 to 75 amperes.

EXAMPLE I

Hydrogen plasma gas, at a rate of 225 SCFH was introduced into and heated by the plasma arc heater which had a tungsten cathode with a thoriated tip and a copper anode. The power into the gas was calculated to be 23.8 kilowatts. The plasma gas was introduced into the space between the cathode and anode from inlet slots which were constructed to provide tangential flow to the hydrogen gas. Hydrogen, at room temperature and in an amount equal to 150 SCFH was introduced into the collimator of the arc heater as attenuating gas. The attenuating hydrogen was introduced from inlet slots which were constructed to provide tangential flow in a direction opposite to that which the hydrogen plasma gas was introduced.

Through the top slot of the reactant inlet assembly was introduced 18 SCFH anhydrous hydrogen chloride, 90 SCFH hydrogen and 1.26 grams per minute of 1,1,2-trichloroethane. Through the middle slot was introduced 6 SCFH of hydrogen chloride, 50 SCFH of hydrogen and 61.9 grams per minute of titanium tetrachloride. 12 SCFH of argon and 84.1 grams per minute of boron trichloride were introduced into the bottom slot of the reactant inlet assembly. Titanium diboride product was collected in three cyclone receivers which acted as a partial classifier of the product. The product from the receivers had a surface area which varied from about 4 to about 7 square meters per gram ($m^2/g$). Surface area was measured by the method of Brunauer, Emmett, and Teller, *J. Am. Chem. Soc.*, 60, 309

(1938). This method (B.E.T.) measures the absolute surface area of a material by measuring the gas adsorbed under special conditions of low temperature and pressure. The B.E.T. surface areas reported herein were obtained using nitrogen gas at liquid nitrogen temperatures (−196° C.) and a pressure of 150 mm. of mercury (0.2 relative pressure).

Using substantially the above conditions, the arc heater ran substantially free of product growth on the reactant inlet assembly and reactor walls for five days. There were no unscheduled shutdowns for product growth. The conversion of titanium tetrachloride to titanium diboride was 90.3 percent, based on titanium tetrachloride. As may be expected, operating conditions varied slightly over the period of five days of operation. The above described conditions were those recorded at noon on the fifth day of operation.

EXAMPLE II

Hydrogen plasma gas, at a rate of 225 SCFH, was heated by the plasma arc heater of Example I. The power into the hydrogen was calculated to be about 21 kilowatts. The swirl component of the heated hydrogen gas was cancelled by introducing 150 SCFH of hydrogen attenuating gas at ambient temperatures into the collimator of the arc heater. Gas flows to the reactant inlet assembly were as follows:

| Gas | |
|---|---|
| TOP SLOT | AMOUNT |
| Hydrogen Chloride | 12 SCFH |
| Hydrogen | 60 SCFH |
| 1,1,2-trichloroethane | 1.26 grams/minute |
| MIDDLE SLOT | AMOUNT |
| Hydrogen chloride | 12 SCFH |
| Hydrogen | 20 SCFH |
| $TiCl_4$ | 61.9 grams/minute |
| BOTTOM SLOT | |
| Argon | 6 SCFH |
| $BCl_3$ | 84.1 grams/minute |

After about 85 minutes of operation, the ratio of hydrogen plasma gas to hydrogen attenuating gas was changed from 1.5:1 to 1.25:1 by lowering the flow rate of hydrogen plasma gas to 208 SCFH and increasing the flow rate of attenuating gas to 167 SCFH. After about 2 more hours of operation, the ratio of hydrogen plasma gas to attenuating gas was changed to 2:1 by increasing the flow rate of the hydrogen plasma gas to 250 SCFH and lowering the flow rate of attenuating gas to 125 SCFH. The unit was shut down after about 2¾ hours operation at these conditions. The unit was inspected for titanium diboride product growth on the reactant inlet assembly and none was found. The B.E.T. surface area of samples of titanium diboride taken from the conduit before the cyclone-receivers during the above-described period of operation ranged from 8.6 to 10.9 m²/g.

EXAMPLE III

Hydrogen plasma gas, at a rate of 208 SCFH, was heated by the plasma arc heater of Example I. The power into the hydrogen was calculated to be about 24 kilowatts. The swirl component of the heated hydrogen gas was cancelled by introducing 150 SCFH of hydrogen attenuating gas at ambient temperature into the collimator of the arc heater. The ratio of hydrogen plasma gas to attenuating gas was therefore 1.38:1. Gas flows to the reactant inlet assembly were the same as described in Example II except that the rate of argon introduced into the bottom slot was about 5 SCFH.

After about 2½ hours of operation the ratio of hydrogen plasma gas to attenuating gas was changed to 1.5:1 by increasing the flow rate of hydrogen plasma gas to 225 SCFH. After about 2¾ hours operation at these conditions, the flow rate of hydrogen plasma gas was lowered to 208 SCFH and the flow rate of hydrogen attenuating gas raised to 167 SCFH, i.e., a ratio of 1.25:1. After about 2 hours of operation at these conditions, the flow rates were changed to 250 SCFH of hydrogen plasma gas and 125 SCFH of hydrogen attenuating gas, i.e., a ratio of 2:1. Operation was continued under these conditions for about 2¼ hours.

During the 9½ hours of operation indicated in which the ratio of hydrogen plasma gas to attenuating gas was varied, no difficulties were encountered as a consequence of product growth on the reactant inlet assembly or the reactor wall. The B.E.T. surface area of samples of titanium diboride powder taken from the conduit before the cyclone-receivers during the above-described period of operation ranged from 6.3 to 9.5 m²/g.

At the end of the aforesaid operation, the power to the arc heater was increased so that the power into the hydrogen plasma gas was about 27 kilowatts. The flow rates of hydrogen plasma gas and hydrogen attenuating gas were changed to about 225 SCFH and 150 SCFH respectively, and the amount of the reactants were increased to about 1.7 grams/minute for 1,1,2-trichloroethane, about 82 grams/minute for the titanium tetrachloride and about 112 grams/minute for the boron trichloride. The remainder of the gas flows through the reactant inlet assembly remained the same. After about 1¼ hours of operation, the unit was shut down because of suspected titanium diboride product growth on the reactant inlet assembly. Such growth was found in the reactor. It appeared to have fallen off during the shutdown. A sample of titanium diboride taken from the conduit before the cyclone-receiver just prior to shutdown had a B.E.T. surface area of 6.4 m²/g. The reason for the product growth occurring was not readily apparent, and because of the many changes in operating conditions preceding the shutdown, no cause could be determined.

The data of Examples I–III demonstrate that the vortical flow of a vortex stabilized hydrogen plasma can be cancelled to provide a well-collimated gas stream that can be used to produce finely-divided particulate powders, e.g., titanium diboride, without product growth on the reactant inlet assembly or the reactor wall. The data of Examples II and III show also that the ratio of hydrogen plasma gas to attenuating gas can be varied for a given set of stable operating conditions. Operation of the process heretofore described has shown that it can be run for extended periods without objectionable product growth, i.e., substantially growth free. There may be minor amounts of product growth occurring, which are not objectionable during a long operating period at constant conditions. These are caused, it is believed, by the variations occurring in the gas flow rates due, for example, to pressure surges at various points in the system.

Although the present process has been described with reference to specific details of certain embodiments thereof, it is not intended that such details should be regarded as limitations upon the scope of the invention except as and to the extent that they are included in the accompanying claims.

We claim:

1. In the process of producing refractory metal boride, carbide, silicide, nitride, and sulfide powder of a metal selected from groups III-IV and the ferro metals of group VIII of the Periodic Chart of the Elements by gas phase reaction of reactants (a) halide of the selected metal and (b) a source of boron, carbon, silicon, nitrogen or sulfur respectively in the presence of hydrogen, wherein the reactants are mixed with a heated gas stream produced by a gas vortex stabilized plasma arc heater and reacted in a reactor, the improvement which comprises passing plasma gas through said arc heater to thereby provide a heated gas stream with a vortical flow pattern, mixing with said heated gas a cancelling amount of cooler attenuating gas, said attenuating gas having a flow pattern opposite to the heated gas, thereby providing a well-collimated hot gas stream capable of sustaining said gas phase reaction, forwarding said well-collimated gas stream to said reactor, introducing reactants into said well-collimated gas stream, and removing finely divided refractory metal powder from said reactor.

2. The process of claim 1 wherein the ratio of the volumes of plasma gas to attenuating gas is from 3:1 to 1:1.

3. The process of claim 1 wherein the plasma gas and attenuating gas are the same.

4. The process of claim 1 wherein the plasma gas and attenuating gas are each selected from the group consisting of hydrogen, nitrogen and noble gases.

5. The process of claim 1 wherein the refractory metal powder is a boride, carbide, or nitride of the metals of groups III–VI.

6. The process of claim 5 wherein the metals of groups III–VI are selected from the group boron, aluminum, silicon, titanium, zirconium, vanadium, tantalum, molybdenum and tungsten.

7. In the process of producing refractory metal boride, carbide, silicide, nitride and sulfide powder of a metal selected from groups III–VI and the ferro metals of group VIII of the Periodic Chart of the Elements by gas phase reaction of reactants (a) halide of the selected metal and (b) a source of boron, carbon, silicon, nitrogen or sulfur respectively in the presence of hydrogen, the improvement which comprises heating a plasma gas, with a gas vortex stabilized plasma arc heater, thereby establishing a hot plasma gas stream with a vortical flow path, mixing with said hot plasma gas stream a cancelling amount of cooler attenuating gas having a flow path opposite to the hot plasma gas stream, thereby providing a well-collimated hot gas stream, forwarding said well-collimated hot gas stream to a reactant mixing zone, introducing reactants into said mixing zone, forwarding well-collimated hot gas stream and reactants from said mixing zone to a reactor, and removing finely divided refractory metal powder from said reactor.

8. The process of claim 7 wherein the ratio of the volumes of plasma gas to attenuating gas is from 3:1 to 1:1.

9. The process of claim 8 wherein the ratio is from 1.5:1 to 2:1.

10. The process of claim 8 wherein the plasma gas and attenuating gas are each selected from the group consisting of noble gas, hydrogen and nitrogen.

11. The process of claim 10 wherein the attenuating gas is the same as the plasma gas.

12. The process of claim 7 wherein the refractory metal powder is a boride or carbide of the metals of groups III–VI and the plasma and attenuating gases are hydrogen.

13. The process of claim 7 wherein the refractory metal powder is a nitride of the metals of groups III–V and the plasma gas and attenuating gas are each selected from the group hydrogen and nitrogen.

14. The process of claim 12 wherein the metals of groups III–VI are selected from the group boron, aluminum, silicon, titanium, zirconium, vanadium, tantalum and tungsten.

15. The process of claim 12 wherein the refractory metal powder is titanium diboride or silicon carbide.

* * * * *

UNITED STATES PATENT AND TRADEMARK OFFICE
CERTIFICATE OF CORRECTION

PATENT NO. : 4,022,872
DATED : May 10, 1977
INVENTOR(S) : Donald R. Carson and Calvin B. Holden It is certified that error appears in the above-identified patent and that said Letters Patent are hereby corrected as shown below:

Column 15,
Claim 1, line 3, "groups III-IV" should read
--groups III-VI--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks